United States Patent [19]

Baughman et al.

[11] 4,438,976
[45] Mar. 27, 1984

[54] METHOD OF REPAIR OF SHORT CIRCUITS FOR IN SITU LEACHING

[75] Inventors: David R. Baughman, Mesa, Ariz.; Jerry R. Bergeson, Golden, Colo.

[73] Assignee: Occidental Research Corporation, Irvine, Calif.

[21] Appl. No.: 406,022

[22] Filed: Aug. 6, 1982

[51] Int. Cl.³ ............... E21B 43/26; E21B 43/28; E21B 33/138

[52] U.S. Cl. ............... 299/4; 166/270; 166/271; 166/281; 166/292; 166/295

[58] Field of Search ............ 166/270, 271, 281, 292, 166/295, 300, 308; 299/4, 5

[56] References Cited

U.S. PATENT DOCUMENTS

| | | | |
|---|---|---|---|
| 2,122,452 | 7/1938 | Clason | 166/281 |
| 3,199,586 | 8/1965 | Henderson et al. | 166/271 X |
| 3,486,559 | 12/1969 | Flickinger et al. | 166/292 X |
| 3,500,913 | 3/1970 | Nordgren et al. | 166/271 X |
| 3,583,167 | 6/1971 | Parks | 61/34 |
| 3,612,608 | 10/1971 | Manker et al. | 299/4 X |
| 3,733,833 | 5/1973 | Parks | 405/264 |
| 3,743,020 | 7/1973 | Suman, Jr. et al. | 166/281 X |
| 3,795,276 | 3/1974 | Eilers et al. | 166/295 |
| 3,967,681 | 7/1976 | Curzon | 166/277 |
| 4,018,286 | 4/1977 | Gall et al. | 166/295 |
| 4,043,599 | 8/1977 | Lingane et al. | 299/4 |
| 4,091,868 | 5/1978 | Kozlowski et al. | 166/250 |
| 4,147,211 | 4/1979 | Sandiford | 166/292 X |
| 4,290,485 | 9/1981 | Free et al. | 166/281 |
| 4,386,806 | 6/1983 | Axen et al. | 299/5 |

OTHER PUBLICATIONS

Brochure re Dowell Additive M-174, Dowell Division of the Dow Chemical Company, Tulsa, OK 74102.

Primary Examiner—George A. Suchfield
Attorney, Agent, or Firm—Christie, Parker & Hale

[57] ABSTRACT

In an acidic in situ leaching system, a short circuit passage through a subterranean formation between a fracture associated with an injection well and a fracture associated with a production well can be plugged by introducing a non-acidic liquid for displacing acidic leach liquid from the short circuit passage, introducing into the injection well a basic composition including a sealing material that gels under acidic conditions, and introducing sufficient liquid into the injection well to displace at least a portion of the basic composition containing sealing material from the injection well into the short circuit passage. Liquid flow between the injection well and the production well is then discontinued for a sufficient time for residual acid in the subterranean formation surrounding the short circuit passage to contact the sealing material and cause gelation of the sealing material in the short circuit passage. The introduction of acidic leach liquid to the formation can then continue. The sealing material may be a polymer or a water soluble silicate.

35 Claims, 1 Drawing Figure

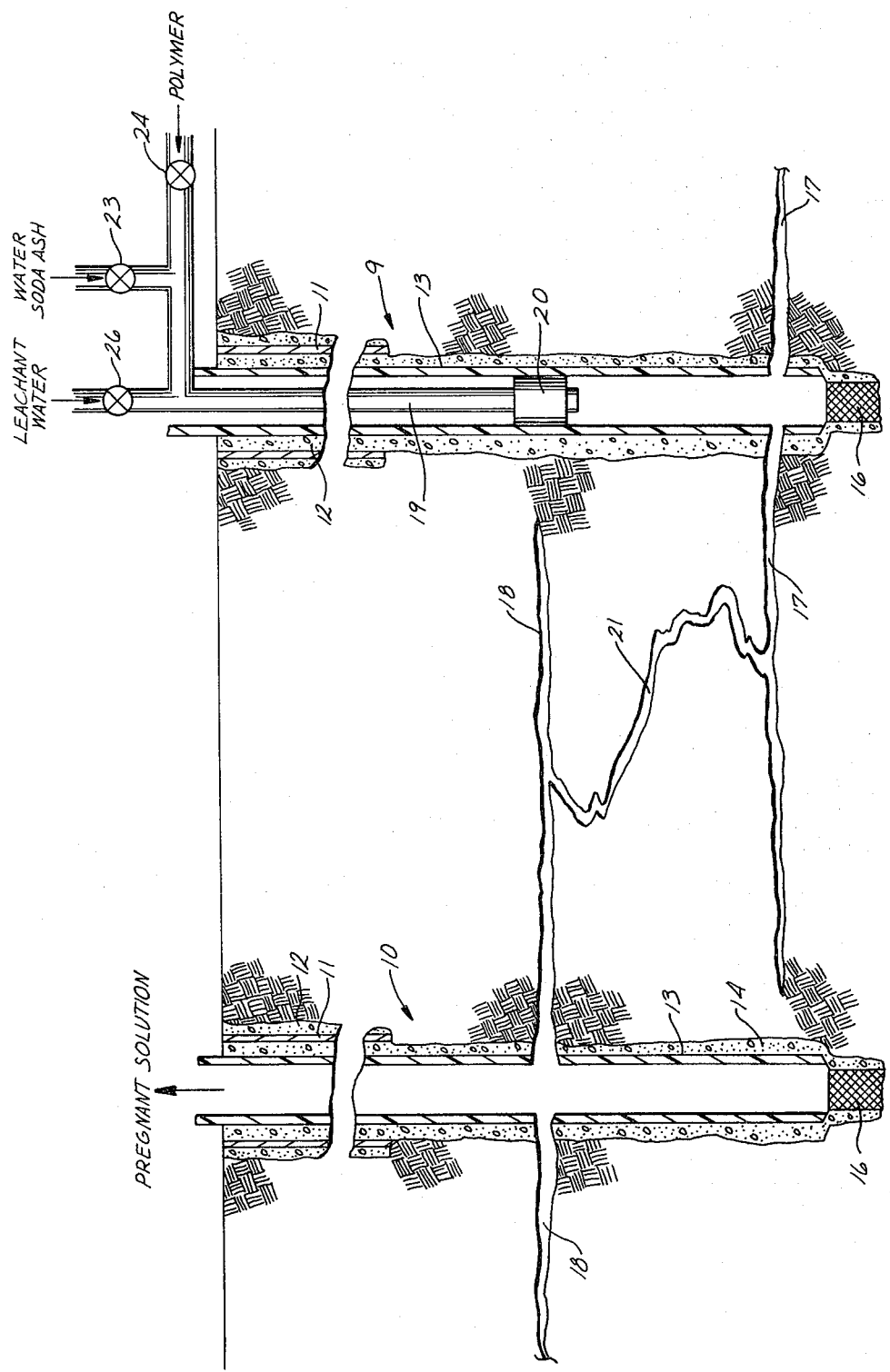

METHOD OF REPAIR OF SHORT CIRCUITS FOR IN SITU LEACHING

FIELD OF THE INVENTION

This invention relates to leaching of mineral values from subterranean formations and particularly to repair of leakage through short circuit passages formed between adjacent wells. Such repair can be effected by introducing a pH-sensitive polymer into the short circuit passage and allowing it to gel.

BACKGROUND OF THE INVENTION

In some circumstances, it can be desirable to leach mineral values from subterranean formations without conducting any mining operations. Such a technique can be useful, for example, where the grade or location of the ore body or the geologic conditions make extraction of the mineral values by conventional mining uneconomical. In such a situation, it can be desirable to leach the mineral values directly from the in situ subterranean formation.

In an exemplary in situ leaching operation, two or more wells are drilled to the portion of the subterranean formation containing desired mineral values. A leachant or lixiviant can be introduced in one or more injection wells to permeate the subterranean formation and a pregnant solution containing dissolved mineral values can be withdrawn from one or more adjacent production wells.

For example, a plurality of wells can be drilled several hundred feet to an ore body containing copper minerals to be leached. These can be oxidized copper minerals which are considered "soluable" since they can be dissolved in sulfuric acid solution, or "insoluable" copper minerals such as sulfides which require oxidation before they can be dissolved. A sulfuric acid solution, which can also contain ferric sulfate or the like for oxidizing insoluble copper minerals, is introduced as a leachant through one or more such injection wells. Sufficient pressure is maintained in the injection well that the leachant permeates through the copper ore body to one or more production wells. A pregnant solution containing copper values leached from the subterranean formation is withdrawn from the production wells. The leach solution can flow through the formation due to inherent permeability in the formation or at least in part due to artificially induced permeability. Such artificial permeability can be induced in the subterranean formation by hydraulic fracturing, for example.

The inherent permeability of many subterranean formations can be rather low and to obtain a reasonable volume of flow of liquid through the formation, rather high pressure gradients must be employed between injection and production wells. An injection well can, for example, have a wellhead pressure of several hundred psi. This pressure is superimposed on the hydrostatic head of the column of liquid in the well. In an embodiment where flow from a production well is induced by pressure applied to an injection well, the production well has the hydrostatic head of pregnant solution in the well. Alternatively, the pressure in a production well can be substantially less than the hydrostatic head where a submersible pump or air lift is employed for withdrawing pregnant solution.

After a well for in situ leaching has been drilled, it may be completed with fiber reinforced plastic pipe as a well bore casing. Such glass fiber reinforced plastic pipe is inserted in the well bore and the annulus between the pipe and surrounding formation is closed by pumping a grout of Portland cement or the like around the casing. This provides a casing in the well bore which is resistant to leach solutions such as sulfuric acid.

It is desirable to localize the introduction or withdrawal of liquid between the well bore and surrounding formation. The casing is, therefore, perforated at desired elevation in the well. Standard perforating tools employing projectiles, explosive charges, cutters, or the like, as commonly employed in oil wells are used for perforating the casing in a well for in situ leaching. Hydraulic fractures are induced adjacent such perforations. Such fracturing is induced after isolating a section of the well bore at the elevation where fracturing is desired. This section can be isolated by a conventional packer when near the bottom of a well or by a conventional straddle packer when at an elevation remote from the bottom of the well. Hydraulic pressure is increased in the isolated section of the well until the fracture extends radially a desired distance. Such radial fractures can be formed at a plurality of elevations by perforating the well at such elevations and isolating each elevation with a conventional straddle packer or the like.

When a subterranean formation is hydraulically fractured, the orientation of the resultant fracture depends on the depth below the ground surface and geologic factors. When formation is hydraulically fractured at depths less than about 1000 feet, fractures extend generally horizontally from the well. When formation is fractured at depths greater than about 3000 feet, the fractures extend generally vertically. Between about 1000 and 3000 feet below the surface, fractures can extend horizontally or vertically depending on local geologic conditions such as tectonic pressure, types of rock, presence of bedding planes, special measures taken to initiate fractures with a selected orientation, and the like. At a given elevation, fracture orientation can often be predicted or measured.

There are basically two different types of arrangements of injection and production well fractures. In the first, a plurality of radial fractures are formed by hydraulic fracturing around the injection well. When the depth of the well is such that generally horizontal fractures occur in the ore body, the fractures are formed at a plurality of elevations in the ore body. When the depth of the ore body is such that generally vertical fractures are formed by hydraulic fracturing, a plurality of vertical fractures can be formed extending in radial directions from the injection well.

Similarly, a plurality of radial fractures are formed by hydraulic fracturing around the production wells. Preferably the fractures are artificially propped with corrosion resistant particles so as to remain open when fracturing pressure is removed and provide channels for liquid flow during leaching.

In the second type of arrangement, which is used at depths in which fractures extend generally horizontally, the casing in the injection well is perforated at a selected elevation in the formation to be leached. Sufficient hydraulic pressure is applied at such elevation for fracturing the formation surrounding the injection well, thereby forming a radially extending, generally horizontal fracture. The fracture is extended at least most of the distance between the injection and production wells. The fracture can extend beyond a production well so long as the casing in the production well is not ruptured at that elevation.

Similarly, the casing in the production wells is perforated at a different elevation than the elevation of perforation in the injection well. A hydraulic fracture is extended radially from each such production wells at the elevation of that perforation. The fractures generally extend most of the distance between the production and injection wells.

In the first arrangement, the fractures adjacent the injection and production wells are limited to prevent the formation of short circuit passages between fractures, i.e., a direct communication between the fractures associated with the injection and production wells. In the second arrangement, the injection and production fractures overlap in horizontal extent and leave a zone of unfractured formation at elevations between the fractured zones. Thus, in each case, a zone of unfractured formation separates the two fractured zones. The fractured zone associated with the injection well essentially forms a fluid manifold for introduction of leachant to the zone of unfractured formation between the injection and production wells. Similarly, the fractured zone associated with a production well serves as a fluid manifold for withdrawing pregnant solution from the zone of unfractured formation.

It is important that there are no short circuits, passages through the unfractured formation, providing direct fluid communication between injection and production fractures so that liquid is caused to flow through the zone of unfractured formation between such unconnected fractures. However, such direct fluid communication occasionally occurs due to natural fissures or channels through unfractured formation, or when injection and production fractures inadvertently intersect. Such could occur, for example, if leachant pressure is higher than the fracture extension pressure. Fluid communication between injection and production wells can also occur through a portion of the formation having an inherently high natural permeability or through a portion that develops high permeability as a consequence of leaching minerals from the formation.

Direct fluid communication between injection and production fractures can lead to the bypassing of leachant and dilution of pregnant solution with leachant. Portions of the formation may not be leached if direct communication occurs.

It is therefore desirable to reduce or eliminate direct liquid flow between injection and production fractures whether due to inadvertent intersection of such fractures, high permeability regions of the formation, or naturally occurring fissures in the formation. Such a technique for reducing liquid flow is preferably enhanced or at least not degraded by leach solutions, such as the sulfuric solutions commonly used for leaching copper minerals.

SUMMARY OF THE INVENTION

In accordance with the invention, there is provided a method for reducing direct fluid communication through a short circuit passage in an unfractured formation between an injection well fracture and a production well fracture. The method comprises the injection of a liquid material that is capable of forming a gel under the conditions present during leaching into the short circuit passage.

When the leach liquid is acidic, fluid communication through a short circuit passage in an unfractured formation is reduced by injecting a non-acidic liquid that displaces the acid from the short circuit passage. A non-acidic liquid containing a sealing material that gels under acidic conditions is then pressure-injected into the short circuit passage. Sufficient liquid is injected behind the sealing material for displacing the sealing material through the formation to the region where it is desired to reduce fluid communication. Liquid flow is then discontinued for a sufficient time for residual acid in the formation surrounding the short circuit passage to contact the sealing material and cause it to gel.

Following at least initial gelling, introduction of acidic leachant can be resumed. Preferably leachant is reintroduced at low pressure to prevent displacement of the partially gelled sealing material. Such additional acid can promote further gelling of the sealing material. The injection pressure can then be gradually increased to obtain a desired flow rate.

BRIEF DESCRIPTION OF THE DRAWINGS

These and other features and advantages of the present invention wil be appreciated as the same becomes better understood by reference to the following detailed description when considered in conjunction with the accompanying drawing which illustrates semi-schematically an exemplary relationship between fractures associated with injection and production wells.

DETAILED DESCRIPTION

The drawing illustrates in schematic vertical cross section an exemplary injection well 9 and an exemplary production well 10 for in situ leaching. The injection well 9 is employed for the introduction of leach liquid into an ore body containing leachable mineral values such as, for example, copper-bearing minerals. The production well 10 is employed for recovering leach liquid pregnant with dissolved minerals values.

Both wells are formed by drilling a relatively large diameter hole from the ground surface to a depth determined by local conditions and government regulations. A so-called surface casing 11 is set in the drilled hole and the annulus between the surface casing and the borehole is filled with a cement grout 12. The balance of the well is drilled at a smaller diameter through the surface casing to a desired depth. When the desired depth has been reached, a glass fiber reinforced plastic pipe casing 13 is set in the well to a position near the bottom, and the annulus between the plastic pipe and the borehole and between the plastic pipe and the surface casing is filled with a cement grout 14. If desired, an intermediate steel casing can also be employed in the well bore for additional strength and potential utility in refurbishing such a well.

Miscellaneous other features can be included in a well, such as, for example, a plastic screen 16 in a portion of the hole open to the formation at the bottom of the plastic pipe casing 13. A variety of conventional valves, check valves, pressure gauges, and the like can be connected to the well heads and are omitted from the drawing. Only certain connections employed in practice of this invention are indicated schematically in the drawing.

After the injection well 9 has been completed as described, one or more inlet fractures 17 indicated as an exaggerated crevice in the drawing is formed adjacent the well for introducing leachant from the injection well bore to the surrounding subterranean formation. The plastic casing is perforated at a select elevation and hydraulic pressure is applied for fracturing the formation adjacent the injection well bore. The amount of hydraulic pressure is sufficient to generate an inlet fracture extending at least most of the distance from the injection well to the production well. Standard techniques for performating the casing and commencing, enlarging, and propping fractures can be employed. Such techniques are, for example, described in *Hydraulic Fracturing* by G. C. Howard and C. R. Fast, published by The Society of Petroleum Engineers of A.I.M.E. (1970).

Likewise, after the production well 10 has been completed as described, one or more outlet fractures 18, also indicated as an exaggerated crevice in the drawing, is formed adjacent the well for withdrawing leachant between the production well bore and the surrounding subterranean formation. The plastic casing is perforated at an elevation vertically spaced apart from the perforation in the plastic casing of the injection well. Hydraulic pressure is then applied for fracturing the formation adjacent the production well bore. The hydraulic pressure is sufficient to generate an outlet fracture extending from the production well bore at least most of the way to the injection well bore.

Following fracturing of the formation between the injection and production wells at the selected elevations, in situ leaching of the unfractured subterranean ore body between the inlet and outlet fractures can commence.

In an exemplary embodiment, stainless steel tubing 19 is inserted down the plastic casing of the injection well and a conventional packer 20 is set in the casing to isolate the region of the casing perforations from the balance of the injection well bore. Acidic leach solution is then introduced through the tubing 20 to the region of the well bore isolated by the packer. Sufficient pressure is applied for injecting the leach liquid through the inlet fracture 17 into the formation adjacent the inlet fracture 17 and inducing flow of leach liquid through the ore body to the outlet fracture 18 of the production well from which pregnant leach liquid is withdrawn.

In the illustrated embodiment, it is assumed that a short circuit passage 21 has occurred in the formation between inlet fracture 17 and outlet fracture 18. This permits direct fluid communication through the subterranean formation between the inlet and outlet fractures. Such a short circuit reduces the proportion of leach liquid flowing through the formation for dissolving valuable minerals.

Repair of the short circuit is accomplished by injecting a water soluble sealing material that gels under acidic conditions into the short circuit passage. As used herein, the terms "gels" is intended to encompass any process of setting up or hardening of the liquid material to make it relatively impervious to flow from the acidic leachant to be used in the solution mining process.

The sealing material polymerizes or gels in an acidic environment or in contact with multivalent cations in acidic or neutral solution. The gel has a generally rubber-like consistency capable of completely plugging the flow paths of the short circuit passage through the unfractured formation between the inlet and outlet fractures. The gel is sufficiently strong to avoid displacement in relatively large voids in the short circuit passage under the pressures involved during in situ leaching.

Before injecting the sealing material into the short circuit passage to reduce "leakage" between injection and production wells, the volume of sealing material needed can be estimated by tracer tests. A liquid containing a dye or other tracer is injected in a first well and liquid is withdrawn from the well in fluid communication with the first well. The volume of liquid injected before the tracer appears in the withdrawal well indicates the volume of liquid in the path of fluid communication. A desired quantity of solution of sealing material can then be injected. By following the "slug" of sealing material with another liquid, the slug of sealing material can be displaced to a desired location in the leakage path.

Such sealing material and other liquids can be injected by use of conventional mixing and pumping equipment typically available at an in situ leaching site. A mixture of the sealing material and water is made in mixing tanks and pumped into a well with the same pumps used for injecting leachant.

Exemplary sealing materials for purposes of the present invention are organic materials having an acid reaction and which form a precipitate, as a complex, chelate or other, with multivalent metal. Suitable materials of this type are descrived in detail in U.S. Pat. No. 3,583,167, the disclosure of which is hereby incorporated by this reference. These could include certain fats, proteins, e.g., albumins, albuminates, peptones, organic acids, carbohydrates, polyhydroxy compounds, e.g., lignins, tanins, aromatic polyhydroxy compounds such as polyhydroxy phenols, hydroxy benzoic acid, activated amino acid materials such as those disclosed in U.S. Pat. No. 3,396,104, the disclosure of which is incorporated herein by this reference, and the like. The compounds preferably contain multifunctional groups, e.g., OH-SH-etc.

Other exemplary materials for purposes of the present invention are the "water-soluble organic polymers" described in detail in U.S. Pat. No. 3,733,833, the disclosure of which is hereby incorporated by the reference. The terminology "water-soluble organic polymer" as used herein refers to the anionic or ampholytic organic materials composed of a number of repeating units and containing a plurality of carboxylic groups. The useful polymers are characterized by dispersibility in water to form visually continuous solutions or dispersions. This includes truly water-soluble polymers which disperse in water to provide homogeneous, transparent solutions subject to water dilution without phase separation. Also included within the meaning of water soluble, as used herein, are the water-swellable polymers which readily disperse in water to provide a highly disperse and visually continuous system of individually distinct gel particles.

In addition to the carboxylic groups the presence in and along the polymer chain of a number of other hydrophilic moieties sufficient to more than offset the otherwise hydrophobic character of the organic polymer can be present. One class of such hydrophilic moieties includes the ionizable groups. Among these are the sulfate and sulfonate groups, carboxylate salt groups, amino and ammonium groups, the latter being inclusive of protonated as well as quarternary derivatives of the amines, e.g., mono-, di- and trialkyl substituted ammonium salt groups, and phosphoric acid groups and mono- and dibasic salts thereof. Whenever acid salts are referred to, those genenerally intented are the alkali metal, alkaline earth metal (water-soluble species thereof) and ammonium salts.

Another class of water-solubility imparting, hydrophilic moities are such nonionizable groups as carboxamide and mono- and dialkyl N-substituted carboxamides, having a total of up to about eight carbons. Also of a hydrophilic nature, through less strongly than some of the aforementioned groups are, hydroxyl, acetal, ketal, carbamate and lactam groups. In any event, the polymers employed herein contain a plurality of carboxylic groups and may also contain one or more of the aforedescribed hydrophilic moieties, and the like, in and along the polymer chain in a sufficient amount to render the resulting polymer water-soluble as defined above.

The polymers used in the invention are characterized by a high molecular weight. An adequate molecular weight is shown if the polymer can be obtained as a particulate solid and a 2 percent by weight solution of the polymer in water, at a pH of 7, has a viscosity measured with a Brookfield viscosimeter at 25° C. of at least 10 centipoises.

Technology for preparing the water-soluble polymers useful herein is known. Useful ethylenicaly polymerized polymers are described in Hedrick et al, U.S. Pat. No. 2,625,529, Aimone et al., U.S. Pat. No. 2,740,522 and Booth et al., U.S. Pat. No. 2,729,557. A variety of water-soluble polysaccharide derivatives are described in Gloor, U.S. Pat. No. 2,728,725. Water-soluble polyurethanes or chain extended polyols are taught in Honea et al., U.S. Pat. No. 3,054,778 and a variety of polycarbonates and polylactams in Hibbard et al., U.S. Pat. No. 3,044,982; Walles et al., U.S. Pat. No. 2,946,772; Vitales, U.S. Pat. No. 2,874,124 and Fong et al., U.S. Pat. No. 3,000,830. There are to mention but a few of the well-known chemical avenues for the preparation of water-soluble, macromolecules. Further general descriptions of a variety of water-soluble, particulate macromolecules is contained in Davidson and Sittig, "Water-Soluble Resins," Reinhold Publishing Corp., New York, 1962.

Preferred for use herein are water-soluble carbamoyl polymers which are at least partially hydrolyzed. The most common forms of these are ethylenically polymerized polymers having attached along their polyalkane backbone a plurality of carbamoyl groups according to the formula:

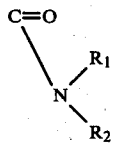

wherein $R_1$ and $R_2$ are independently selected from the group of hydrogen and alkyl hydrocarbons with one to four carbons.

In particular, useful carbamoyl polymers include the various water-soluble homopolymers and copolymers of acrylamide and methacrylamide. Other carbomoyl polymers are the various water-soluble copolymers of N-substituted acrylamides such as N-methyl acrylamide, N-propyl acrylamide and N-butyl acrylamide. Still other carbamoyl polymers are prepared from the amides and half amides of maleic and fumaric acids. In general, any ethylenically unsaturated and polymerizable monomer, which contains the carbamoyl group, may be employed in the preparation of the preferred carbamoyl polymers.

Best results are obtained, if at least about 25 mole percent of the polymerized monomers have carbamoyl substituents. The balance of the comonomers used to prepare the copolymers can be provided in the form of any water-soluble, or water-insoluble, monoethylenically monomer copolymerizable therewith, so long as the total amount of water-soluble monomers used is sufficient to import water-solubility to the finished polymer.

Other water-soluble polymers useful herein are the lightly cross-linked water-swellable polymers. Such cross-linking can be achieved by irradiation of linear, water-soluble polymers under conditions which promote cross-linking or by incorporating a small amount, e.g., up to 1 percent by weight, of a polyfunctional monomer into the polymerization recipe for a linear water-soluble polymer. Examples of such monomers, which may be copolymerized with monoethylenically unsaturated monomers, and methylenebisacrylamide, divinylbenzene, divinylether, divinylether of ethylene glycol and the like.

It is usually preferred that the polymer form a near neutral or basic pH value when dispersed in an aqueous solution, i.e., one which will not cause in acidic pH and thus cause a premature precipitate in the treatment fluid.

As indicated, one type of polymer found to be especially effective for this purpose is acrylamide polymers, including specifically polyacrylamide in varying degrees of hydrolysis and acrylamide copolymerized with one or more ethylenically unsaturated monomers such as acrylic acid, vinylbenzenesulfonic acid, and alkali and alkaline earth metal salts of such acids as described in U.S. Pat. No. 2,831,841, column 3, lines 34 to 45, and in U.S. Pat. No. 2,909,508, Examples 1 to 5.

Other suitable sealing materials are the water soluble silicates, such as sodium or potassium silicate. These materials react with acid to form silica acid gel. The physical properties of silica acid gels are largely dependent upon the strength of the acid and silicate solutions. With weak acid, such as acetic acid, the aqueous silicate can react slowly, forming a gel only after many hours. This control feature is particularly advantageous in that it allows the sealing material to be properly positioned in the formation before any gelling occurs.

The presently preferred sealing material is a polymeric material available from the Dowell Division of The Dow Chemical Company, Tulsa, Okla. 74102, as Dowell Additive M-174. This material is marketed to assist in preventing pollution caused by the migration of acidic fluids through refuse, soil, and geologic formations. For example, it may be used to help vegetate refuse heaps containing pyrites and to control acid drainage from mines. Solutions of Dowell Additive M-174 react with acid mine waters to form acid insoluble precipitates which are capable of plugging soil and rock permeability.

The presently preferred polymeric material is available as a low density brown powder which forms a viscous basic solution or suspension in water. A suitable consistency of M-174 polymer for closing a leakage path between injection and production wells is about 0.3 pounds of additive per gallon of water. Sodium carbonate can be added for making the solution more basic.

As is customary in high polymer terminology, the preferred polymeric material is referred to herein as water soluble, regardless of whether if forms a true solution or is actually in the form of a substantially stable dispersion of polymeric materials suspended in water. The preferred polymeric material polymerizes or gels in an acidic environment or in contact with multivalent cations in acidic or neutral solution.

The unfractured subterranean formation between injection and production wells employed for in situ leaching of copper minerals, for example, is exposed to leach liquid containing sulfuric acid and hence is strongly acidified. Residual liquid in the formation can also contain appreciable metal salts such as copper sulfate. Contact of such acidified formation by the solution of sealing material could result in premature gelation and plugging. A volume of non-acidic liquid such as water is, therefore, injected through the short circuit passage in advance of the solution of sealing material. The non-acid liquid is pumped through the tubing 19 and into the region of the injection well bore below the packer 20. The non-acidic liquid is introduced at the injection well head by a valve 23. Water or a soda ash solution (sodium carbonate) are suitable inexpensive materials to use as a "spearhead" in advance of the sealing solution. If desired, water can be injected for a portion of the non-acidic liquid, followed by a portion of soda ash solution to assure that the formation surrounding the short circuit passage is at least temporarily basic. Other neutral or basic solutions will be apparent.

When a water preflush is used instead of a basic solution, it is desirable that a soda ash solution or the like be readily available for injection in the event continuity between the water preflush and sealer injection is disturbed; the soda ash solution can be used to prevent premature gelation of the sealing material.

The volume of non-acidic liquid injected into the short circuit passage through the unfractured formation is preferably about one to two times the volume of solution of sealing material to be injected. This quantity of liquid is sufficient for diluting and displacing most of the acid along the flow path. If less than this volume of fluid is employed, sufficient acid may remain along the flow path to cause premature gelation of the sealing material. If the quantity of non-acidic liquid is more than about twice the volume of solution of sealing material, an excess quantity of acid may be neutralized or displaced from the formation. At least the initial gelation of the sealing material is caused by migration of acid and/or metal cations remaining in the acidified formation. An excess quantity of non-acidic liquid in advance of the solution of sealing material may inhibit initial gelation.

Following injection of the non-acidic liquid, a solution of sealing material is injected into the short circuit passage in the formation. The sealing solution is pumped into the injection well bore and inlet fracture through tubing 19. The flow of polymer solution is controlled at the well head by valve 24.

Following injection of the desired quantity of solution containing sealing material, additional non-acidic liquid is injected through the valve 23 at sufficient pressure to displace the solution of sealing material through the formation to a desired location in the short circuit passage between the inlet and outlet fracture. A similar quantity of liquid can be withdrawn from the production well for assuring that the solution of sealing material is displaced largely into the short circuit passage. Preferably the injection pressure for transfer of polymer into the short circuit passage is less than the injection pressure during leaching operations. This minimizes introduction of sealing material into pores in the formation which could interfere with subsequent leaching operations by reducing formation permeability.

In the event some of the sealing material gels in the inlet fracture or the injection well bore, it can be removed by flushing with soda ash solution or the like. Gelation by acid is generally reversible and a basic solution can be used to redissolve the gelled sealing material.

After the desired amount of non-acidic liquid has been injected for displacing the sealing solution to a desired location in the formation, the wells are shut-in so that liquid flow between the wells is terminated, thereby avoiding further displacement of sealing material. The wells are left shut-in for several days so that there is ample time for the sealing material to gel.

Gelation of the sealing material occurs as acid and metal cations in the unfractured formation surrounding the short circuit passage migrate into contact with the sealing material. Some acid remains in the formation following the flush with non-acidic liquid prior to injection of the sealing solution, either in temporary combination with minerals or isolated in crevices, pockets and other permeable portions of the formation from which acid is not displaced during flushing. Acid and multivalent cations can diffuse into contact with the sealing material and promote initial gelation.

Liquid flow through the formation is discontinued for a sufficient time that such acid and metal cations in the formation can induce substantial gelation of the sealing material. It is believed that about one to two days is sufficient for migration of acid and initial gelation of the sealing material under most circumstances. Shutting in the wells for more than about four days is not believed necessary.

Further, it is not believed necessary to have complete gelation of the sealing material before reintroducing leachant into the formation. Substantial resistance to displacement of the sealing material is provided by incomplete gelation and further gelation can proceed rapidly once additional acid is injected into the formation. Thus, after a suitable time period for initial gelation of the sealing material, introduction of acidic leachant into the injection well through valve 26 can be resumed. Preferably the pressure is kept low for a sufficient time for at least some of the newly injected leachant to reach the production well. This assures that the injected sealing material is exposed to acid sufficiently to promote further gelation before full injection pressures are achieved.

Following such emplacement of sealing material in the short circuit passage and initial injection of low pressure leach liquid, the injection pressure is gradually increased for further exposing the sealing material to acid and assuring complete gelation while at the same time gradually approaching the desired flow rate between injection and production wells. Pressure and flow are monitored and in the event some direct communication remains or becomes reestablished, another cycle of injection of sealing material can be provided for further reducing such direct fluid communication.

The presently preferred sealing material is essentially non-hazardous and, hence, can be readily handled at the well site without special precautions or highly-trained personnel. The material is inexpensive and stable and a quantity can be keep on site for use when needed. The powder is easily mixed with water to the desired strength and consistency using pumps and auxiliary tanks usually available at a well site. For example, mixing is easily accomplished by use of a "mud gun" jet mixer, such as is commonly used for mixing drilling mud additives. Recirculating the mixture through the well injection pumps back into the auxiliary tanks assures complete and uniform mixing.

Various alterations can be made to the above-described process without departing from the principles and scope of the invention. For example, the sealing material can be mixed with a weak acid, such as acetic acid, and injected into the formation. This method has two advantages. First, the mixture would not depend on residual formation acid to gel. This assures that all of the sealing material will gel and little or none would be subject to being displaced by premature injecton of the acidic leachant. Second, the waiting time before resumption of the introduction of the acidic leachant can be reduced.

Although described herein in an exemplary embodiment with respect to an in situ leaching technique employing sulfuric acid and a sealing material that gels under acidic conditions, it will be apparent that similar principles can be employed in an in situ leaching system employing basic leaching solutions wherein the sealing material is in acidic solution when injected and gels in situ when subjected to basic conditions. Such basic in situ leaching is employed, for example, with sodium carbonate for leaching uranium ores or ammoniacal solutions for some types of copper ore. The pregnant solution can also contain multivalent metal cations which can also cause gelation of the sealing material.

In the preferred embodiment, the sealing material is injected into a short circuit passage through the injection well. This is done because the equipment required to inject liquids into the formation is already at the injection well. However, if desired, the liquid for displacing the leachant in the short circuit and the solution containing the sealing material can be injected into the short circuit passage through the production well.

If desired, so-called lost circulation or bridging materials can be included in the solution of sealing material injected in the well bore. Such lost circulation materials include substantially inert fibers, silica flour, sand, vermiculite, or the like which tend to plug permeable portions of the subterranean formation. Such lost circulation materials can be included for reinforcing the gelled sealing material.

Many other modifications and variations will be apparent to those skilled in the art. It is, therefore, to be understood that within the scope of the appended claims, this invention may be practiced otherwise than as specifically described.

What is claimed is:

1. A method for reducing leakage of leachant through a short circuit passage in a subterranean formation between a first fracture in communication with a first well and a second fracture in communication with a second well in an in situ leaching system comprising the steps of:
   introducing leachant having a first pH into the subterranean formation surrounding the short circuit passage;
   introducing into the short circuit passage an aqueous solution having a second pH and containing a sealing material that gels at the first pH; and
   discontinuing liquid flow between the first and second wells for a time sufficient for residual leachant in the subterranean surrounding the short circuit passage to initiate gelation of the sealing material.

2. A method as recited in claim 1 wherein the first pH is acidic and the second pH is basic.

3. A method as claimed in claim 1 wherein the sealing material comprises a polymer.

4. A method as claimed in claim 1 wherein the sealing material comprises a water soluble silicate.

5. In an in situ leaching system utilizing an acidic material as a leachant, a method for at least partially plugging a path of direct communication between an injection well and a production well comprising the steps of:
   introducing into the path of direct communication a non-acidic aqueous liquid for displacing at least a portion of such acidic material from the path of direct communication;
   introducing into the injection well an aqueous composition containing a sealing material that gels under acidic conditions;
   introducing sufficient non-acidic aqueous liquid into the injection well for displacing at least a portion of such sealing material from the injection well into the path of direct communication; and
   discontinuing liquid flow through the injection well for a sufficient time for residual acidic material in the subterranean formation surrounding the path of direct communication to gel such sealing material.

6. A method as recited in claim 5 wherein the volume of non-acidic aqueous liquid introduced into the injection well before the aqueous composition containing sealing material is in the range of from about one to two times the volume of the aqueous composition containing sealing material.

7. A method as recited in claim 5 wherein the non-acidic aqueous liquid introduced before the aqueous composition containing sealing material has a basic pH.

8. A method as recited in claim 5 wherein the aqueous composition containing sealing material has a basic pH.

9. A method as recited in claim 5 wherein the non-acidic aqueous liquid introduced into the injection well after the aqueous composition containing sealing material has a basic pH.

10. A method as claimed in claim 5 wherein the sealing material comprises a polymer.

11. A method as claimed in claim 5 wherein the sealing material comprises a water soluble silicate.

12. A method as recited in claim 5 wherein liquid flow through the injection well is discontinued for at least about one day after displacing such polymeric material into the path of direct communication, and thereafter acidic leachant is introduced to the injection well.

13. A method for reducing leakage of leachant through a short circuit passage in a subterranean formation between a first fracture in communication with a first well and a second fracture in communication with a second well in an in situ leaching system comprising the steps of:
   introducing leachant having a first pH into the subterranean formation surrounding the short circuit passage;
   displacing the leachant from the short circuit passage with an aqueous liquid having a second pH;
   introducing into the first well an aqueous solution of sealing material that is stable at the second pH and gels at the first pH;

introducing an aqueous liquid having a pH at which the sealing material does not gel to the first well for displacing the aqueous solution of sealing material from the first well into the short circuit passage; and discontinuing liquid flow between the first and second wells for a time sufficient for residual leachant in the subterranean surrounding the short circuit passage to initiate gelation of the sealing material.

14. A method as recited in claim 13 wherein the first pH is acidic and the second pH is basic.

15. A method as recited in claim 13 further comprising flushing the first well and first fracture with sufficient aqueous liquid having a pH at which the sealing material does not gel to remove at least a portion of the sealing material from the first well and first fracture prior to discontinuing the liquid flow.

16. A method as recited in claim 13 wherein the volume of aqueous liquid introduced before the aqueous solution of sealing material is in the range of from about one to two times the volume of the solution of sealing material.

17. A method as recited in claim 13 wherein the volume of aqueous liquid introduced for displacing at least a portion of the sealing material from the first well into the short circuit passage is about the same as the volume of the first fracture and the injection well.

18. A method as claimed in claim 13 wherein the sealing material comprises a polymer.

19. A method as claimed in claim 13 wherein the sealing material comprises a water soluble silicate.

20. In an in situ leaching system utilizing an acidic leach liquid, a method for reducing flow of leach liquid through a path of direct communication through a subterranean formation between an inlet fracture connected to an injection well and an outlet fracture connected to a production well comprising the steps of:

introducing an acidic leach liquid into the subterranean formation surrounding the path of direct communication;

introducing via the injection well a non-acidic aqueous liquid for displacing acidic material from the path of direct communication;

introducing into the injection well and inlet fracture a basic aqueous composition containing a polymeric material that gels under acidic conditions;

introducing sufficient non-acidic aqueous liquid into the injection well for displacing at least a portion of such polymeric material from the injection well and inlet fracture into the path of direct communication; and discontinuing liquid flow through the injection well for a sufficient time for residual acidic material in the subterranean formation to gel at least a portion of the polymeric material.

21. A method as recited in claim 20 wherein the volume of non-acidic aqueous liquid introduced into the injection well before the aqueous composition containing polymeric material is in the range of from about one to two times the volumes of the aqueous composition containing polymeric material.

22. A method as recited in claim 20 wherein the non-acidic aqueous liquid introduced before the aqueous composition containing polymeric material has a basic pH.

23. A method as recited in claim 20 wherein the non-acidic aqueous liquid introduced into the injection well after the aqueous composition containing polymeric material has a basic pH.

24. A method as recited in claim 20 wherein the volume of basic liquid introduced into the injection well after the aqueous composition containing polymeric material is about the same as the volume of the injection well and the inlet fracture.

25. A method as recited in claim 20 wherein liquid flow through the injection well is discontinued for at least about one day and thereafter acidic leach liquid is introduced to the injection well.

26. In an in situ leaching system utilizing an acidic leach liquid, a method for plugging a short circuit passage through a subterranean formation between an inlet fracture extending from an injection well and an outlet fracture extending from a production well comprising the steps of:

introducing an acidic leach liquid into the subterranean formation surrounding the short circuit passage;

setting a packer in the well bore of the injection well at a level above the inlet fracture;

introducing into the portion of the well bore below the packer a non-acidic aqueous liquid for displacing acidic liquid from the inlet fracture and the short circuit passage;

introducing into the portion of the well bore below the packer a basic aqueous composition including a polymeric material that gels under acidic conditions, the volume of basic aqueous composition being in the range of from about one-half to about the same volume of the non-acidic aqueous liquid;

introducing a basic aqueous liquid into the portion of the well bore below the packer and the inlet fracture for displacing at least a portion of the polymeric material from the well bore and inlet fracture into the short circuit passage;

discontinuing liquid flow through the injection well for at least about one day; and thereafter resuming introduction of acidic leach liquid into the subterranean formation.

27. A method as recited in claim 26 wherein the non-acidic aqueous liquid introduced before the aqueous composition containing polymeric material has a basic pH.

28. An in situ mineral leaching process comprising:
drilling at least a first and a second well into a subterranean formation containing leachable mineral values;

introducing acidic leach solution into the subterranean formation through such a first well;

removing acidic leach solution pregnant with mineral values from such a second well;

reducing the flow of leach solution through a path of direct communication between the first and second well by the steps of:

injecting a non-acidic liquid into the path of direct communication for displacing at least a portion of the acidic leach solution therein;

injecting into the path of direct communication a solution containing a sealing material that gels under acidic conditions; and discontinuing liquid flow through the path of direct communication for a sufficient time for residual acid in the subterranean formation to cause gelation of at least a portion of the sealing material; and resuming injection of acidic leach liquid into the subterranean formation through such a first well.

29. A method as recited in claim 28 wherein the volume of non-acidic liquid introduced before the solution containing polymeric material is in the range of from about one to two times the volume of the solution containing polymeric material.

30. A method as recited in claim 28 wherein the non-acidic liquid introduced before the solution containing polymeric material has a basic pH.

31. A method as recited in claim 28 further comprising flushing the well through which the polymeric material was injected with a sufficient basic aqueous liquid for displacing at least a portion of the polymeric material from the well.

32. A method as recited in claim 28 wherein introduction of leach liquid into the subterranean formation is discontinued for at least about one day.

33. A method as claimed in claim 28 wherein the sealing material comprises a polymer.

34. A method as claimed in claim 28 wherein the sealing material comprises a water soluble silicate.

35. A method for recovering a soluble mineral from an in situ subterranean formation comprising the steps of:
   drilling at least one injection well in the formation;
   drilling at least one production well in the formation spaced horizontally from such an injection well;
   hydraulically fracturing formation adjacent such an injection well for forming a leachant introduction manifold;
   hydraulically fracturing formation adjacent such a production well for forming a solution withdrawal manifold;
   plugging a short circuit passage through the subterranean formation between the leachant introduction manifold and the solution withdrawal manifold by the steps of:
      introducing an acidic leachant for such soluble mineral into the subterranean formation through the leachant introduction manifold and withdrawing pregnant solution containing such soluble mineral from the subterranean formation through the solution withdrawal manifold;
      injecting sufficient non-acidic liquid into the short circuit passage for displacing at least a portion of the leachant;
      injecting a solution containing a polymeric material that gels under acidic conditions through the injection well and leachant introduction manifold and into the short circuit passage;
      flushing the injection well and leachant introduction manifold with sufficient basic aqueous liquid for displacing at least a portion of the polymeric material from the injection well and leachant introduction manifold;
      discontinuing liquid flow through the short circuit passage for at least about one day; and resuming injection of leachant into the subterranean formation through the injection well.

* * * * *